(12) United States Patent
Guy et al.

(10) Patent No.: US 9,054,427 B2
(45) Date of Patent: Jun. 9, 2015

(54) PLANAR VIVALDI ANTENNA ARRAY

(75) Inventors: Ronald Frank Edward Guy, Maldon (GB); Larry Brian Tween, Chelmsford (GB); Gary David Panaghiston, Billericay (GB); Bruno Peter Pirollo, Maldon (GB)

(73) Assignee: BAE SYSTEMS plc, London (GB)

(*) Notice: Subject to any disclaimer, the term of this patent is extended or adjusted under 35 U.S.C. 154(b) by 190 days.

(21) Appl. No.: 13/702,339

(22) PCT Filed: Jul. 18, 2011

(86) PCT No.: PCT/GB2011/051342
§ 371 (c)(1),
(2), (4) Date: Dec. 6, 2012

(87) PCT Pub. No.: WO2012/010874
PCT Pub. Date: Jan. 26, 2012

(65) Prior Publication Data
US 2013/0099988 A1 Apr. 25, 2013

(30) Foreign Application Priority Data

Jul. 19, 2010 (EP) .................................. 10275072
Jul. 19, 2010 (GB) .................................. 1012079.8

(51) Int. Cl.
*H01Q 13/10* (2006.01)
*F16B 5/06* (2006.01)
(Continued)

(52) U.S. Cl.
CPC ........... *H01Q 13/10* (2013.01); *Y10T 29/49016* (2015.01); *F16B 5/0614* (2013.01); *H01Q 13/085* (2013.01); *H01Q 21/0087* (2013.01); *H01Q 21/064* (2013.01); *H01Q 21/24* (2013.01)

(58) Field of Classification Search
CPC ............ H01Q 13/085; H01Q 21/0087; H01Q 21/064; H01Q 21/24; H01Q 13/10
USPC .......................................... 343/770, 767, 810
See application file for complete search history.

(56) References Cited

U.S. PATENT DOCUMENTS 3,836,976 A * 9/1974 Monser et al. ................ 343/795
4,001,834 A 1/1977 Smith
(Continued)

FOREIGN PATENT DOCUMENTS

BE 452 344 A 10/1943
EP 0 087 400 A1 8/1983
(Continued)

OTHER PUBLICATIONS

International Search Report and Written Opinion dated Dec. 1, 2011 issued in PCT/GB2011/051342.
(Continued)

*Primary Examiner* — Hoanganh Le
(74) *Attorney, Agent, or Firm* — Scully, Scott, Murphy & Presser, PC

(57) ABSTRACT

A planar Vivaldi antenna array, and method of forming such an array, the array comprising: a plurality of slots at an end of the antenna array, the slots extending through the whole thickness of the planar structure of the antenna array; and a plurality of grooves extending from the slots; wherein: the grooves do not extend through the whole thickness of the planar structure of the antenna array; and the cross-sectional shape of the grooves is complementary to the cross-sectional shape of the slots.

10 Claims, 6 Drawing Sheets

(51) Int. Cl.
*H01Q 13/08* (2006.01)
*H01Q 21/00* (2006.01)
*H01Q 21/06* (2006.01)
*H01Q 21/24* (2006.01)

(56) References Cited

U.S. PATENT DOCUMENTS

| | | | |
|---|---|---|---|
| 5,309,165 A * | 5/1994 | Segal et al. | 343/770 |
| 5,845,391 A * | 12/1998 | Bellus et al. | 29/600 |
| 6,501,431 B1 * | 12/2002 | Irion et al. | 343/767 |
| 6,891,511 B1 | 5/2005 | Angelucci | |
| 6,950,062 B1 * | 9/2005 | Mather et al. | 342/372 |
| 7,170,446 B1 | 1/2007 | West et al. | |
| 7,444,736 B1 | 11/2008 | Warning | |

FOREIGN PATENT DOCUMENTS

| | | |
|---|---|---|
| EP | 0 349 069 A1 | 1/1990 |
| FR | 2 908 168 | 5/2008 |
| GB | 2 220 303 A | 1/1990 |
| GB | 2 419 468 A | 4/2006 |

OTHER PUBLICATIONS

Extended European Search Report dated Dec. 16, 2010 issued in European Publication No. EP 10275072.6.
UK Search Report dated Nov. 11, 2010 issued in GB1012079.8.
International Preliminary Report on Patentability and Written Opinion, dated Jan. 31, 2013 from related International Application No. PCT/GB2011/051342.

* cited by examiner

PLANAR VIVALDI ANTENNA ARRAY

FIELD OF THE INVENTION

The present invention relates to antennas. In particular, the present invention relates to, but is not limited to, arrays of Vivaldi antenna elements, for example dual-polarised Vivaldi antenna arrays.

BACKGROUND

Tapered-slot, or Vivaldi, antenna elements are known. A Vivaldi antenna element is a co-planar broadband-antenna. The Vivaldi antenna element 2 comprises a conductive layer 4 disposed on a substrate 6. The conductive layer 4 is disposed on the substrate 6 such that a space 8 in the conductive layer 4 is formed. The distance between the sides of the space 8 widens from a minimum at a narrow end 10 of the space 8 to a maximum at an open end 12 of the space 8. At the narrow end 10, a square, or circular, or other shaped region 13 without conductor is provided. In conventional Vivaldi antenna elements, the space 8 is symmetrical about a central axis 14. Further conductor material 15 extends beyond the narrow end 10 and the region 13.

It is known to form Vivaldi antenna element into arrays. FIG. 2 is a schematic illustration of an example of a Vivaldi antenna array comprising four Vivaldi antenna elements, indicated in FIG. 2 by the reference numeral 2 and separated by dotted lines. Vivaldi antennas arrays may be formed from any number of Vivaldi antenna elements.

FIG. 3 is a schematic illustration of a further example of a Vivaldi antenna array. This example array is a dual-polarised Vivaldi antenna array comprising six interlocking Vivaldi antenna arrays, each array according to the example array of FIG. 2. The six arrays of the dual-polarised Vivaldi antenna array are arranged such that three arrays are vertically polarised (these arrays are indicated in FIG. 3 by the reference numerals 301), and three arrays are horizontally polarised (these arrays are indicated in FIG. 3 by the reference numerals 302). The arrays are arranged such that the Vivaldi antenna elements 2 of each horizontally polarised array 301 are separated by a vertically polarised array 302, and vice versa.

Dual polarised Vivaldi antenna arrays, such as that illustrated in FIG. 3, are conventionally assembled by making use of slots extending half the length of the antenna elements. The slots are conventionally square sided, and as they are cut into the board forming the antenna array, no metallisation is applied to the edges. After the boards are assembled, the corners of the resulting square cells are soldered along the complete depth of the board. This is difficult to perform, and this difficulty is exacerbated by the consideration that good electrical contact is required in all of these areas for the antenna array to perform well. Furthermore, the physical sizes involved are small, e.g. the width of the antenna element may be e.g. 5 mm, in which case the resulting square cell size is e.g. 5 mm×5 mm, which therefore makes accessing with a soldering iron or other equipment along the full depth of the board e.g. 50 mm difficult.

SUMMARY OF THE INVENTION

In a first aspect, the present invention provides a planar Vivaldi antenna array comprising a plurality of slots at an end of the antenna array, the slots extending through the whole thickness of the planar structure of the antenna array, and a plurality of grooves extending from the slots, wherein the grooves do not extend through the whole thickness of the planar structure of the antenna array, and the cross-sectional shape of the grooves is complementary to the cross-sectional shape of the slots.

Surfaces of the planar Vivaldi antenna array that result from forming of the grooves and/or slots may be electrically conductive surfaces.

The grooves may be substantially v-shaped.

The slots may be substantially bow-tie shaped.

A shape of a slots may be a shape that is formed by performing the following: forming first a V-shaped groove in a top surface of the planar Vivaldi antenna array, forming second a V-shaped groove in a bottom surface of the planar antenna array, the second V-shaped groove being opposite the first V-shaped groove, and extending the first V-shaped grove and/or the second V-shaped groove through the planar Vivaldi antenna array towards the opposite groove such that the whole thickness of the planar structure of the antenna array is extended through.

Conductive epoxy may be provided on the grooves and/or the slots.

In a further aspect, the present invention provides a Vivaldi antenna array comprising at least two of the planar Vivaldi antenna arrays of any of the above aspects fixed together by means of the grooves of one and the slots of the other.

Conductive epoxy in the slots and/or grooves conductively may bond the two planar Vivaldi antenna arrays at those places.

In a further aspect, the present invention provides a method of forming a Vivaldi antenna array, the method comprising: providing at least two planar Vivaldi antenna arrays according to any of the above aspects, and sliding the grooves of one planar Vivaldi antenna arrays along the slots of a different planar Vivaldi antenna array.

The grooves and/or the slots may first be provided with conductive epoxy.

The conductive epoxy may be applied in the form of one or more drops, and wherein the epoxy is then spread along the grooves/slots when the planar Vivaldi antenna arrays are slid together.

DETAILED DESCRIPTION

In the following description, terminology such as "vertical", "horizontal" etc. is adopted to describe elements of the invention. It will be appreciated by the skilled person that such terminology is not limiting and is used merely to refer to the position of one element relative to other elements.

Figure 1:
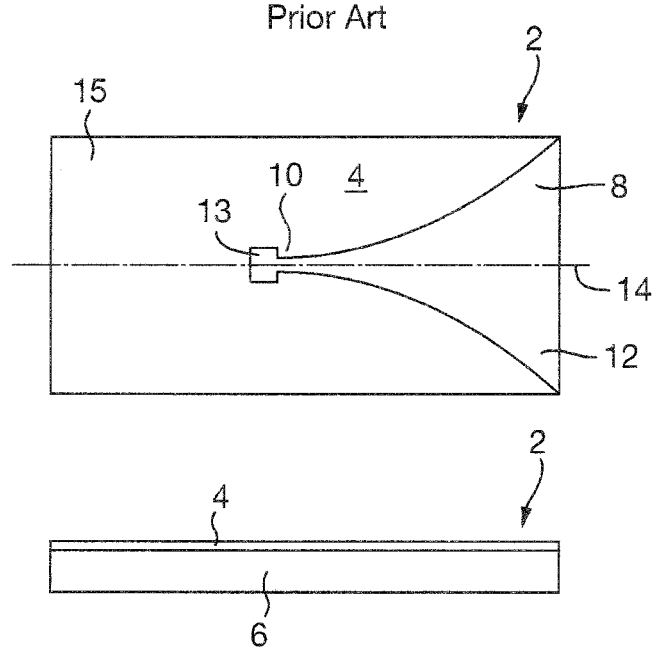
FIG. 1 a schematic illustration of a top surface and a side surface of a typical conventional Vivaldi antenna element.
Figure 2:
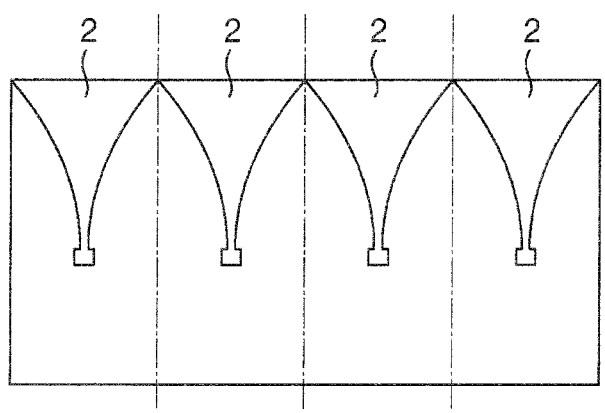
FIG. 2 is a schematic illustration of an example of a Vivaldi antenna array comprising four Vivaldi antenna elements.
Figure 3:
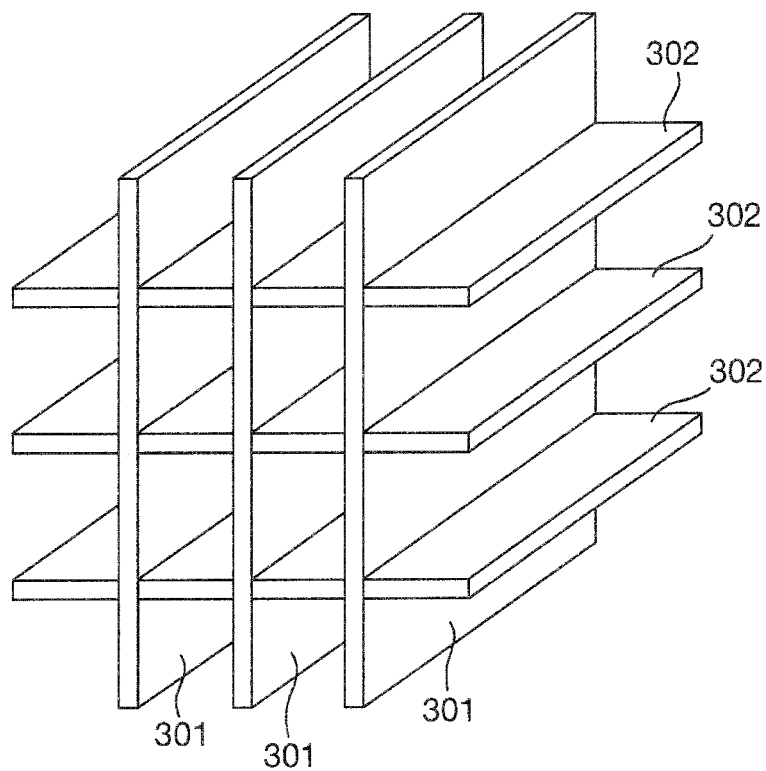
FIG. 3 is a schematic illustration of a further example of a Vivaldi antenna array.
Figure 4:
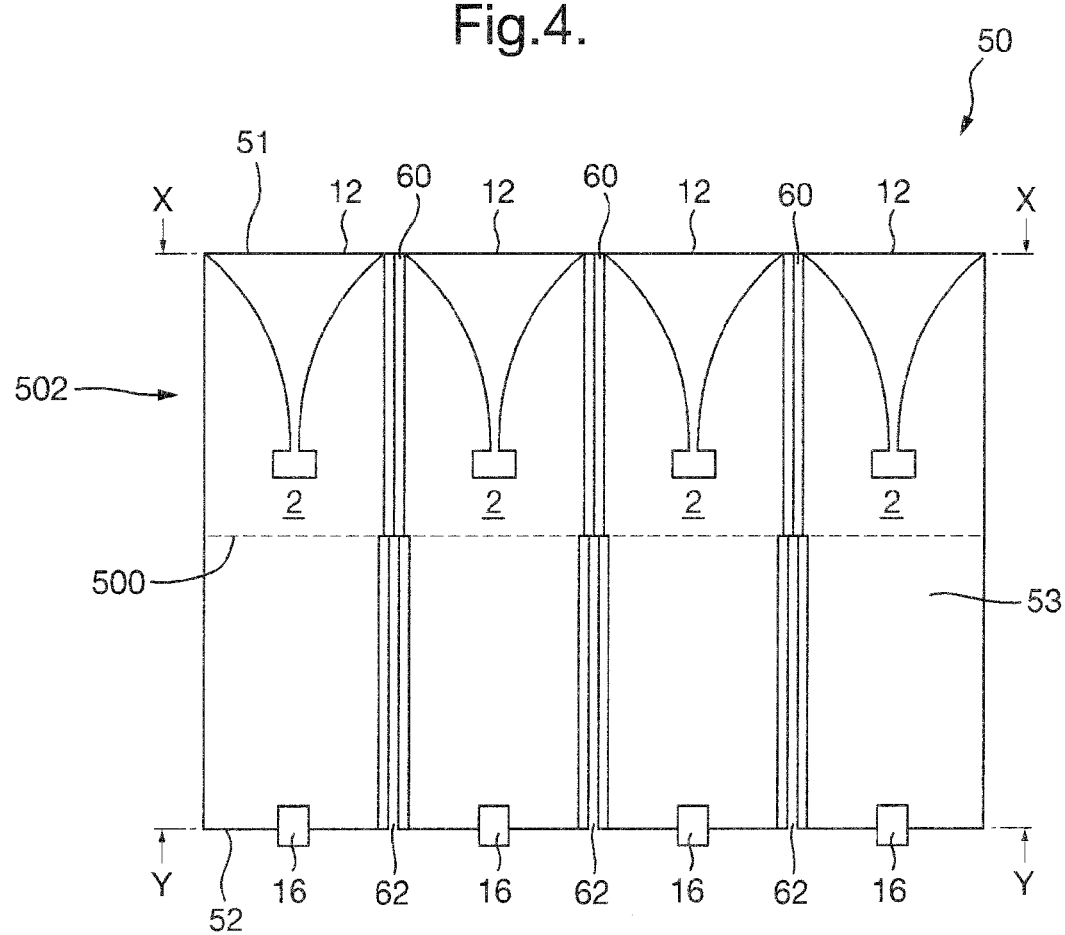
FIG. 4 is a schematic illustration of a Vivaldi antenna array according to a first embodiment of the present invention.

FIG. 4 is a schematic illustration of a Vivaldi antenna array 50 according to a first embodiment of the present invention. In particular, FIG. 4 shows features of a top surface 53 of the Vivaldi antenna array 50. Features of further surfaces of the Vivaldi antenna array 50 are described in more detail later below with reference to FIGS. 5 and 6. In this embodiment, the Vivaldi antenna array 50 comprises four Vivaldi antenna elements 2 arranged in a row 502. In the row 502, the four Vivaldi antenna elements 2 are positioned side-by-side such that the open ends 12 of the Vivaldi antenna elements 2 are level and form a first edge 51 of the Vivaldi antenna array 50, along the direction of the dotted line X-X shown in FIG. 4. Furthermore, the opposite ends of the four Vivaldi antenna elements 2 are level and form a second edge 52 of the Vivaldi antenna array 50, along the direction of the dotted line Y-Y shown in FIG. 4. Thus the first edge 51 and the second edge 52 form two opposite outside edges of the Vivaldi antenna array 50. The first edge 51 and the second edge 52 are parallel.

Each Vivaldi antenna element 2 is provided with a connector 16 at the second edge 52. The connector provides a connection to the conductor layer of the top surface 53, and a separate connection to a conductor layer on the opposite side of the board, i.e. on a bottom surface 54 (described further below with reference to FIGS. 5 and 6). In this embodiment the conductor layer on the opposite surface provides further Vivaldi antenna elements, but this need not be the case, and in other embodiments a planar ground plane may be provided on the bottom surface instead.

In this embodiment, the length of each Vivaldi antenna element 2 is approximately 50 mm (i.e. the distance from the first edge 51 to the second edge 52). However, in other embodiments, other lengths may be provided.

In this embodiment, each Vivaldi antenna element 2 is approximately 15 mm wide, allowing a top frequency of operation of approximately 10 GHz. In other embodiments other widths may be used, allowing other top frequencies. For example, the Vivaldi antenna elements may be 5 mm wide, allowing a top frequency of operation of approximately 30 GHz.

The Vivaldi antenna elements 2 are interspaced by V-shaped grooves 60 extending from the first edge 51 to a central axis 500 of the Vivaldi antenna array 50, as described in greater detail later below with reference to FIG. 5.

The Vivaldi antenna elements 2 are further interspaced by slots 62 extending from the second edge 52 to the central axis 500 of the Vivaldi antenna array 50, as described in greater detail later below with reference to FIG. 6.

Figure 5:
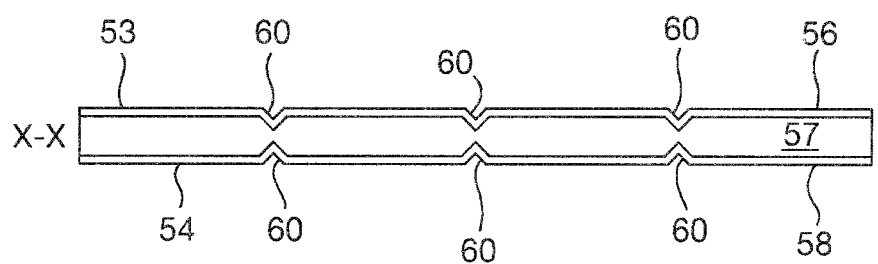
FIG. 5 is a schematic illustration of a cross-section of the Vivaldi antenna array of FIG. 4.

FIG. 5 is a schematic illustration of a cross-section of the Vivaldi antenna array 50 of FIG. 4, at a position corresponding to the dotted line X-X.

The Vivaldi antenna array 50 comprises a first conductive layer 56, a substrate 57, and a second conductive layer 58. The first conductive layer 56 is disposed on a first side of the substrate 57 corresponding to the top surface 53 of the Vivaldi antenna array 50. The second conductive layer 58 is disposed on a second side of the substrate 57 corresponding to a bottom surface 54 of the Vivaldi antenna array 50. In this embodiment the first conductive layer 56 and the second conductive layer 58 are copper. In this embodiment, the substrate 6 is alumina.

The Vivaldi antenna elements 2 that are arranged to form the first edge—51 are interspaced by V-shaped grooves 60 in both the top surface 53 and the bottom surface 54. In this embodiment, the V-shaped grooves 60 separating a pair of Vivaldi antenna elements 2 are such that they are aligned, are substantially the same size, and such that material is present between the V-shaped grooves 60 in the top and bottom surfaces 53, 54, i.e. the V-shaped grooves 60 in the top and bottom surfaces do not join/overlap. In other words, the grooves 60 do not extend through the whole thickness of the substrate 57 and the conductive layers 56, 58 on the substrate 57, i.e. the grooves 60 do not extend through the whole thickness of the planar structure of the antenna 50.

Figure 6:
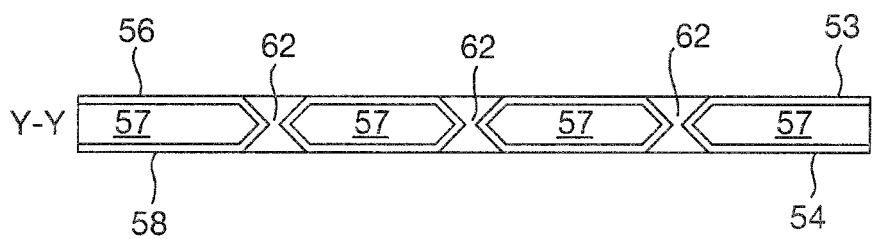
FIG. 6 is a schematic illustration of a further cross-section of the Vivaldi antenna array of FIG. 4.

FIG. 6 is a schematic illustration of a cross-section of the Vivaldi antenna array 50 of FIG. 4, at a position corresponding to the dotted line Y-Y.

Each slot 62 is formed by a V-shaped groove in the top surface 53 and a V-shaped groove in the bottom surface 54 that join/overlap at the apexes of the respective V-shaped grooves to form a slot 62 in the Vivaldi antenna array 50 that passes from the bottom surface 54 to the top surface 53. Accordingly, each slot 62 has an "hourglass", or "bow tie", shaped cross-section. In other words, the slots 62 do extend through the whole thickness of the substrate 57 and the conductive layers 56, 58 on the substrate 57, i.e. the slots 62 do extend through the whole thickness of the planar structure of the antenna 50. The function of the slots 62 will be described in greater detail later below with reference to FIGS. 7 and 8.

Figure 7:
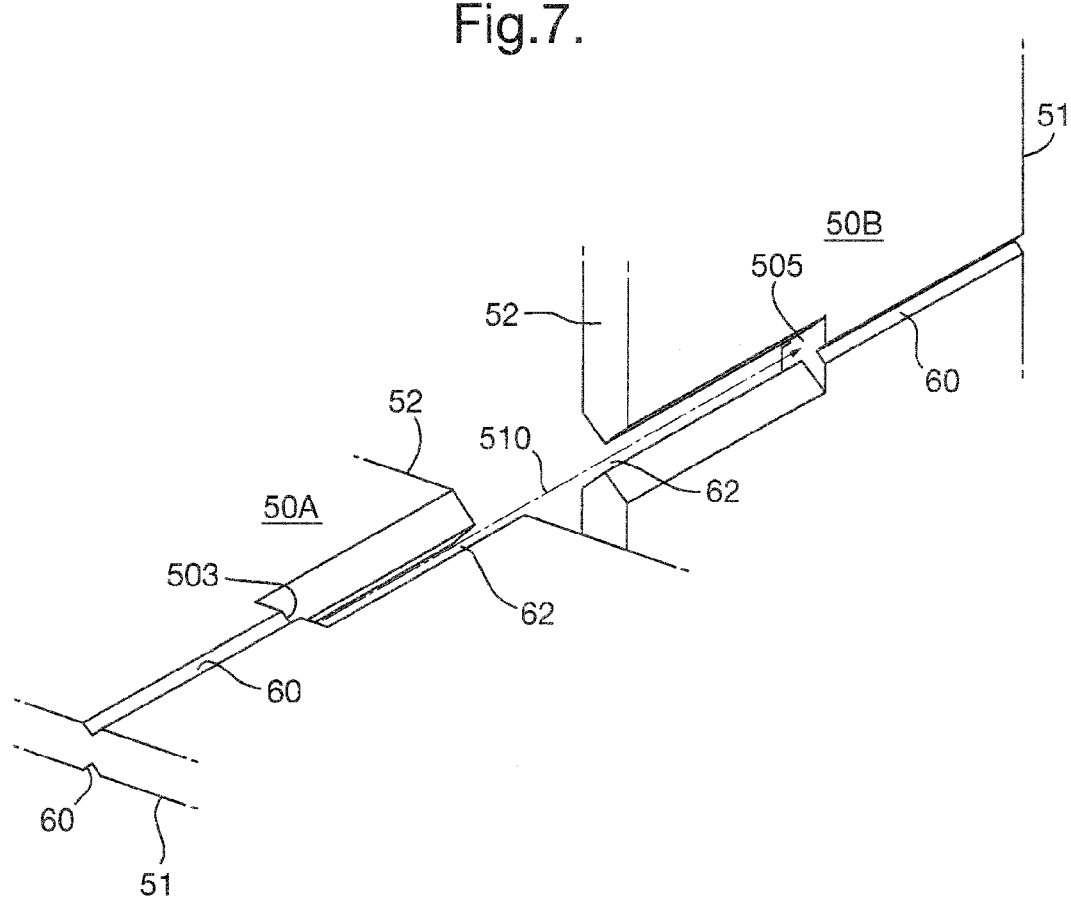
FIG. 7 is a schematic illustration showing how portions of two Vivaldi antenna arrays interlock.

FIG. 7 is a schematic illustration showing how portions of two of the above described Vivaldi antenna arrays 50, hereinafter referred to as the "first array 50A" and the "second array 50B", interlock. In this embodiment, the first array 50A and the second array 50B have substantially the same dimensions.

The first array 50A is positioned orthogonally to the second array 50B such that the slots 62 of the first array 50A align with the slots 62 of the second array 50B. One such slot alignment is shown schematically in FIG. 7.

When in an interlocked position, the first array 50A and the second array 50B are positioned such that a surface, hereinafter referred to as the "first joining surface 503", of the first array 50A is in contact with a surface, hereinafter referred to as the "second joining surface 505", of the second array 50B. In effect, the first array 50A is in the position it would occupy if it were moved along the dotted arrow indicated by the reference numeral 510 in FIG. 7, whilst remaining orthogonal to the second array 50B.

The above described interlocked position of the first array 50A and the second array 50B provides that the V-shaped grooves 60 of the first array 50A are engaged with the slot 62 of the second array 50B. In other words, the surface of the V-shaped grooves 62 of the first array 50A are in contact with the V-shaped surfaces of the second array 50B formed by the hourglass-shaped slot 62 in the second array 50B.

Also, the V-shaped grooves 60 of the second array 50B are engaged with the slot 62 of the first array 50A. In other words, the surface of the V-shaped grooves 62 of the second array 50B are in contact with the V-shaped surfaces of the first array 50A formed by the hourglass-shaped slot 62 in the first array 50A.

The above described interlocked position of the first array 50A and the second array 50B provides that the first edge 51 of the first array 50A is substantially level with the second edge 52 of the second array 50B. Also, the first edge 51 of the second array 50B is substantially level with the second edge 52 of the first array 50A.

Figure 8:
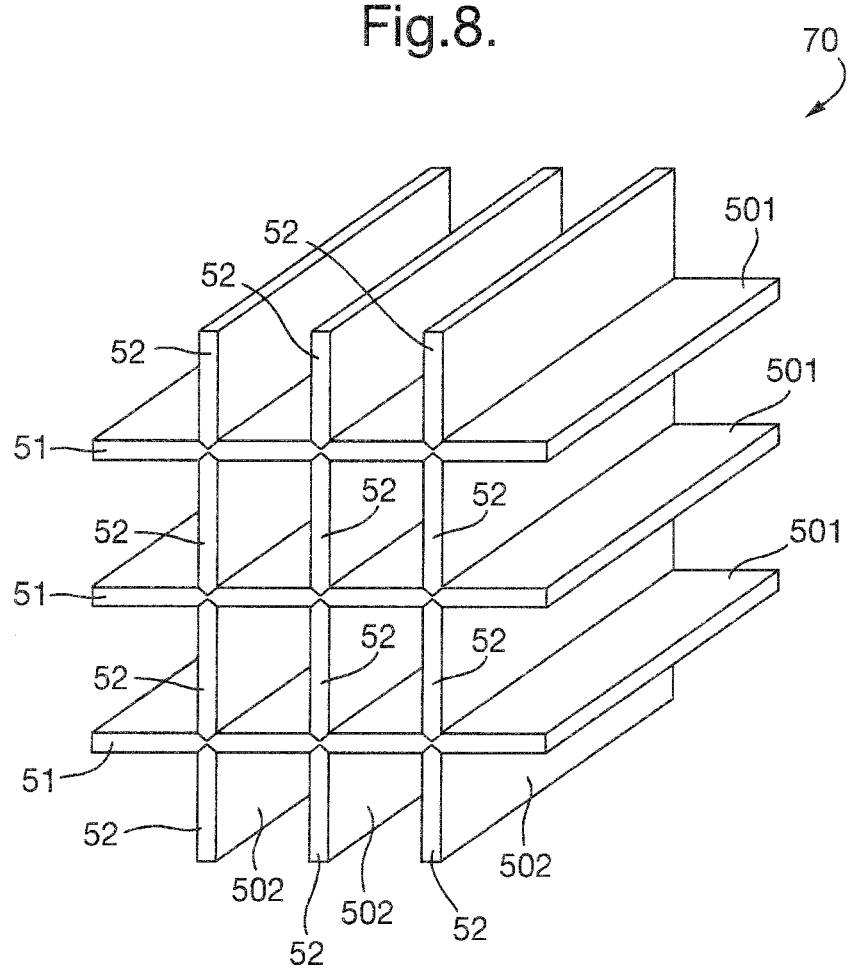
FIG. 8 is a schematic illustration of a dual polarised Vivaldi antenna array according to an embodiment of the present invention.

FIG. 8 is a schematic illustration of a dual polarised Vivaldi antenna array 70 according to an embodiment of the present invention. The dual-polarised Vivaldi Antenna array 70 is formed from the interlocking of six Vivaldi antenna arrays 50 of the type described above with reference to FIGS. 4-7. The three horizontally positioned Vivaldi antenna arrays in FIG. 8 are oriented the same as the first array 50A in FIG. 7, and are thus indicated in FIG. 8 by the reference numeral 50A. Also, the three vertically positioned Vivaldi antenna arrays in FIG.

8 are oriented the same as the second array 50B in FIG. 7, and are thus indicated in FIG. 8 by the reference numeral 50B.

As shown in FIG. 8, the Vivaldi antenna arrays 50A, 50B interlock such that each slot 62 of each first array 50A is engaged with the V-shaped grooves 60 of a different second array 50B. In other words, the V-shaped surfaces of each of the first arrays 50A, formed by the hourglass-shaped slots 62 in the first arrays 50A, are in contact with a surface of a V-shaped groove 62 of a different second array 50B. Also, the Vivaldi antenna arrays 50A, 50B interlock such that each slot 62 of each second array 50B is engaged with the V-shaped grooves 60 of a different first array 50A. In other words, the V-shaped surfaces of each of the second arrays 50B, formed by the hourglass-shaped slots 62 in the second arrays 50B, are in contact with a surface of a V-shaped groove 62 of a different first array 50A.

The above described interlocked position of the first arrays 50A and the second arrays 50B provides that the first edges 51 of the first arrays 50A are substantially level with the second edges 52 of the second arrays 50B.

Also, the first edges 51 of the second arrays 50B are substantially level with the second edges 52 of the first arrays 50A (this is not shown in FIG. 8).

Thus, the dual-polarised Vivaldi antenna array 70 comprising Vivaldi antenna arrays 50A, 50B with V-shaped grooves 60 and slots 62 is provided.

The V-shaped grooves 60 and slots 62 tend to advantageously provide that the dual-polarised Vivaldi antenna array 70 is more structurally stable than conventional dual-polarised Vivaldi antenna arrays.

A further advantage is that the dual-polarised Vivaldi antenna array 70 tends to be easier to construct than conventional dual-polarised Vivaldi antenna arrays. For example, the dual-polarised Vivaldi antenna array 70 tends to avoid the need for soldering from awkward positions.

A further advantage is that the V-shaped grooves 60 and slots 62 tend to advantageously allow for better contact between the conductive layers of the interlocking antenna arrays. This advantageously tends to reduce problems caused by uncontrolled ground planes. Also, this tends to provide a low reflection coefficient.

A further advantage is that due to the grooving and slots as described above, an increased bonding area is provided.

It will be appreciated that the above advantages will tend to be achieved irrespective of the particular conductive bonding arrangement, e.g. soldering, conductive epoxy, etc. that is used to electrically connect the arrays at the interface between the slots and grooves. However, yet further advantages tend to be achieved by the present embodiment due to the particular conductive bonding arrangement employed, details of which will now be described.

In this embodiment the grooves 60 and the slots 62 are metallised. Prior to assembling the various arrays together using the grooves and slots (as shown in FIG. 7), conductive epoxy is applied to the slots 62. In other embodiments, conductive epoxy may be applied to the grooves 60 instead of or in addition to being applied to the slots 62. When the various arrays are assembled together, the conductive epoxy provides structural bonding and electrical connection. This tends to provide good structural stability and good quality electrical connection between elements, in particular due to the aspect that the epoxy can readily be applied such as to provide good coverage along the whole length of the slots and grooves. Moreover, since the conductive epoxy is applied, access to the grooves and/or slots for applying the epoxy is straightforward. In a preferred implementation, the conductive epoxy is applied in the form of spaced apart drops along slots and/or groove, and then when the arrays are slid together as shown in FIG. 7, the interlocking of the slots with respective grooves spreads or smears the epoxy along the slot/groove arrangement, thereby providing coverage along their lengths whilst nevertheless having only had to apply the epoxy in the easier drop by drop manner. Also, by virtue of the implementations described in this paragraph, a weight saving is achieved since e.g. excess solder or conductive epoxy can be alleviated or avoided compared to conventional approaches. Also, the grooves and slots tend to provide a channelling effect, which tends to confine the epoxy thereby alleviating or reducing any run out or leaking of the epoxy onto the conducting surfaces of the antenna elements which in conventional arrangements can occur thereby changing the antenna properties.

In the above embodiments, the grooves 60 (that do not extend through the whole thickness of the planar structure of the antenna array 50) are V-shaped and the slots 62 (that do extend through the whole thickness of the planar structure of the antenna array 50) are shaped accordingly to co-operate with the V-shaped grooves, i.e. are "bow-tie" shaped. However, these particular shapes are not essential, and in other embodiments other interlocking or co-operating shapes of grooves that do not extend through the whole thickness of the planar structure of the antenna array 50 and slots 62 that do extend through the whole thickness of the planar structure of the antenna array 50 may be used. For example, curved cross-sectional profiles may be used (e.g. "C-shaped"). Yet further for example, even if the grooves and slots are (or are based on) square profiles rather than V-shapes, some of the above described advantages would still be obtainable compared to conventional arrangements (which do not provide any grooves that do not extend through the whole thickness of the planar structure of the antenna array 50), even if the square shapes were less advantageous than the above described embodiments.

In the above embodiments, the Vivaldi antenna arrays comprise four Vivaldi antenna elements 2. However, in other embodiments, the Vivaldi antenna arrays may comprise any appropriate number of antenna elements.

In the above embodiments, the dual-polarised Vivaldi antenna array 70 comprises six Vivaldi antenna arrays. However, in other embodiments, the dual-polarised Vivaldi antenna array comprises a different number of Vivaldi antenna arrays.

In the above embodiments, the first arrays 50A and the second arrays 50B have substantially the same dimensions. However, in other embodiments some or all of the first arrays have different appropriate dimensions. Also, in other embodiments, some or all of the second arrays have different appropriate dimensions. Also, in other embodiments some or all of the first arrays have different appropriate dimensions to some or all of the second arrays.

In the above embodiment, the first conductive layer 56 is copper. However, in other embodiments the first conductive layer is a different conductive material.

In the above embodiment, the second conductive layer 58 is copper. However, in other embodiments the second conductive layer is a different conductive material.

In the above embodiments, the substrate is alumina. However, in other embodiments, the substrate is a different appropriate material.

In the above embodiments, horizontally polarised Vivaldi antenna arrays (i.e. horizontally aligned antenna elements for operating with horizontally polarised signals) are interlocked with vertically polarised Vivaldi antenna arrays (i.e. vertically aligned antenna elements for operating with vertically polarised signals). However, in other embodiments, one or more of the vertically polarised antenna arrays may be substituted by an non-antenna structure of substantially the same shape, i.e. a structure having the same shape of the Vivaldi antenna array but comprising no antenna elements, or inactive antenna elements. For example, in other embodiments the horizontally polarised Vivaldi antenna arrays are interlocked with vertically aligned inert structures having the same shape as the Vivaldi antenna array. This tends to advantageously provide improved structural stability and/or conductive layer contact in a Vivaldi antenna array polarised (i.e. orientated) in a single direction.

The invention claimed is:

1. A planar Vivaldi antenna array comprising:
   a substrate comprising an upper conductive layer and a lower conductive layer;
   a plurality of slots at an end of the antenna array, the slots extending through the whole thickness of the planar structure of the antenna array; and
   a plurality of grooves extending from the slots; wherein:
   the grooves do not extend through the whole thickness of the planar structure of the antenna array; and
   the cross-sectional shape of the grooves is complementary to the cross-sectional shape of the slots;
   the upper conductive layer or the lower conductive layer extend into the grooves and over surfaces of the grooves; and
   the upper conductive layer or the lower conductive layer extend into the slots and over surfaces of the slots.

2. A planar Vivaldi antenna array according to claim 1, wherein the grooves are substantially v-shaped.

3. A planar Vivaldi antenna array according to claim 1, wherein the slots are substantially bow-tie shaped.

4. A planar Vivaldi antenna array according to claim 3, wherein a shape of a slots is a shape that is formed by performing the following:
   forming first a V-shaped groove in a top surface of the planar Vivaldi antenna array;
   forming second a V-shaped groove in a bottom surface of the planar antenna array, the second V-shaped groove being opposite the first V-shaped groove; and
   extending the first V-shaped grove and/or the second V-shaped groove through the planar Vivaldi antenna array towards the opposite groove such that the whole thickness of the planar structure of the antenna array is extended through.

5. A planar Vivaldi antenna array according to claim 1, wherein conductive epoxy is provided on the grooves and/or the slots.

6. A Vivaldi antenna array comprising:
   at least two planar Vivaldi antenna arrays comprising:
      a substrate comprising an upper conductive layer and a lower conductive layer;
      a plurality of slots at an end of the antenna array, the slots extending through the whole thickness of the planar structure of the antenna array; and
      a plurality of grooves extending from the slots; wherein:
      the grooves do not extend through the whole thickness of the planar structure of the antenna array; and
      the cross-sectional shape of the grooves is complementary to the cross-sectional shape of the slots,
         the upper conductive layer or the lower conductive layer extend into the grooves and over surfaces of the grooves; and
         the upper conductive layer or the lower conductive layer extend into the slots and over surfaces of the slots,
   wherein the at least two planar Vivaldi antenna arrays being fixed together by means of the grooves of one and the slots of the other, the conductive layers facilitating an electrical connection between the grooves of one and the slots of the other.

7. A Vivaldi antenna array according to claim 6, wherein conductive epoxy in the slots and/or grooves conductively bonds the two planar Vivaldi antenna arrays at those places.

8. A method of forming a Vivaldi antenna array, the method comprising:
   providing at least two planar Vivaldi antenna arrays comprising:
      a substrate comprising an upper conductive layer and a lower conductive layer;
      a plurality of slots at an end of the antenna array, the slots extending through the whole thickness of the planar structure of the antenna array; and
      a plurality of grooves extending from the slots; wherein:
      the grooves do not extend through the whole thickness of the planar structure of the antenna array; and
      the cross-sectional shape of the grooves is complementary to the cross-sectional shape of the slots;
         the upper conductive layer or the lower conductive layer extend into the grooves and over surfaces of the grooves; and
         the upper conductive layer or the lower conductive layer extend into the slots and over surfaces of the slots, and
   sliding the grooves of one planar Vivaldi antenna arrays along the slots of a different planar Vivaldi antenna array.

9. A method according to claim 8, wherein the grooves and/or the slots are first provided with conductive epoxy.

10. A method according to claim 9, wherein the conductive epoxy is applied in the form of one or more drops, and wherein the epoxy is then spread along the grooves/slots when the planar Vivaldi antenna arrays are slid together.

* * * * *